United States Patent [19]

Goertzen

[11] Patent Number: 5,378,119

[45] Date of Patent: Jan. 3, 1995

[54] AIR COMPRESSOR HAVING VENTILATED HOUSING AND MOTOR/COMPRESSOR PULLEY ADJUSTMENT

[76] Inventor: Dennis D. Goertzen, R.R. 1, Box 157, Henderson, Nebr. 68371

[21] Appl. No.: 196,635

[22] Filed: Feb. 15, 1994

[51] Int. Cl.[6] ............................................. F04B 35/00
[52] U.S. Cl. .................................... 417/313; 417/359; 417/362; 417/411; 312/236
[58] Field of Search ............... 417/234, 313, 359, 360, 417/362, 411; 454/250; 312/236

[56] References Cited

U.S. PATENT DOCUMENTS

| | | | |
|---|---|---|---|
| 2,181,127 | 11/1939 | Ferguson | 417/362 |
| 2,367,601 | 1/1945 | Nicol | 417/362 |
| 2,764,948 | 10/1956 | Jones | 417/234 |
| 4,004,862 | 1/1977 | Hill | 417/411 |

FOREIGN PATENT DOCUMENTS

| | | | |
|---|---|---|---|
| 2248651 | 4/1973 | Germany | 417/411 |
| 230968 | 9/1988 | Japan | 417/234 |
| 164583 | 7/1991 | Japan | 417/362 |

*Primary Examiner*—Richard A. Bertsch
*Assistant Examiner*—Roland G. McAndrews, Jr.
*Attorney, Agent, or Firm*—Zarley, McKee, Thomte, Voorhees & Sease

[57] ABSTRACT

An air compressor includes an enclosed housing with a 12-volt electrical motor mounted to a bottom frame within said housing and a compressor pump located vertically above the motor within the housing and operably connected to the motor. A ventilation fan is mounted on the motor adjacent a ventilation panel in one side panel of the housing, to draw air into the housing. The top cover is spaced slightly above the upper edges of opposing side panels of the housing, to form a ventilation space at the upper end of the housing through which air may be circulated around the motor and pump and upwardly out of the housing. The compressor pump is mounted on a base plate which is pivotally mounted along one edge and has an adjustable length leg supporting the opposite edge. The adjustable length leg permits adjustment of the distance between the pump and motor so as to adjust the tension on a drive belt extending between pulleys on the pump and motor.

6 Claims, 3 Drawing Sheets

5,378,119

AIR COMPRESSOR HAVING VENTILATED HOUSING AND MOTOR/COMPRESSOR PULLEY ADJUSTMENT

TECHNICAL FIELD

The present invention relates generally to air compressors, and more particularly to an improved air compressor arranged within an enclosed housing for continuous running while maintaining a cool pump.

BACKGROUND OF THE INVENTION

Because air compressors may be utilized for a wide variety of applications, it is desirable to provide a compressor which is portable and transportable with a consumer. Since many tools are pneumatic, and 110 volt power sources to run conventional air compressors are not always readily available in the field, it is often necessary to transport a large bulky and heavy gas powered air compressor. Other than the obvious problems associated with moving large and bulky equipment, the combustion required to run such compressors may also be a problem in an enclosed environment.

In addition, gasoline powered compressors require the fuel tank be refilled at frequent intervals.

Because conventional gasoline powered air compressors are large and bulky, the transport of such compressors takes a large amount of space in a pickup truck, or requires a separate trailer to be towed behind a vehicle.

While electrically powered air compressors are known in the prior art, they typically require a 110 volt power source to provide the pressure and volume necessary for running air tools and the like. In addition, electrically powered air compressors are subject to overheating if utilized continuously for a long period of time.

Finally, it is frequently difficult and time consuming to replace or adjust the tension on belts extending between the drive motor and the pump of an air compressor.

SUMMARY OF THE INVENTION

It is therefore a general object of the present invention to provide an improved air compressor.

Yet another object of the present invention is to provide an air compressor which may be run off 12-volt electric power yet provide the pressure and volume necessary for running air tools.

Still another object is to provide an improved air compressor with the pump located to prevent overheating.

A further object of the present invention is to provide an improved air compressor with a belt adjustment apparatus which permits simple replacement and adjusting of a belt extending between the pump and motor.

These and other objects will be apparent to those skilled in the art. The air compressor of the present invention includes an enclosed housing with a 12-volt electrical motor mounted to a bottom frame within said housing and a compressor pump located vertically above the motor within the housing and operably connected to the motor. A ventilation fan is mounted on the motor adjacent a ventilation panel in one side panel of the housing, to draw air into the housing. The top cover is spaced slightly above the upper edges of opposing side panels of the housing, to form a ventilation space at the upper end of the housing through which air may be circulated around the motor and pump and upwardly out of the housing. The compressor pump is mounted on a base plate which is pivotally mounted along one edge and has an adjustable length leg supporting the opposite edge. The adjustable length leg permits adjustment of the distance between the pump and motor so as to adjust the tension on a drive belt extending between pulleys on the pump and motor.

DESCRIPTION OF THE PREFERRED EMBODIMENT

Figure 1:
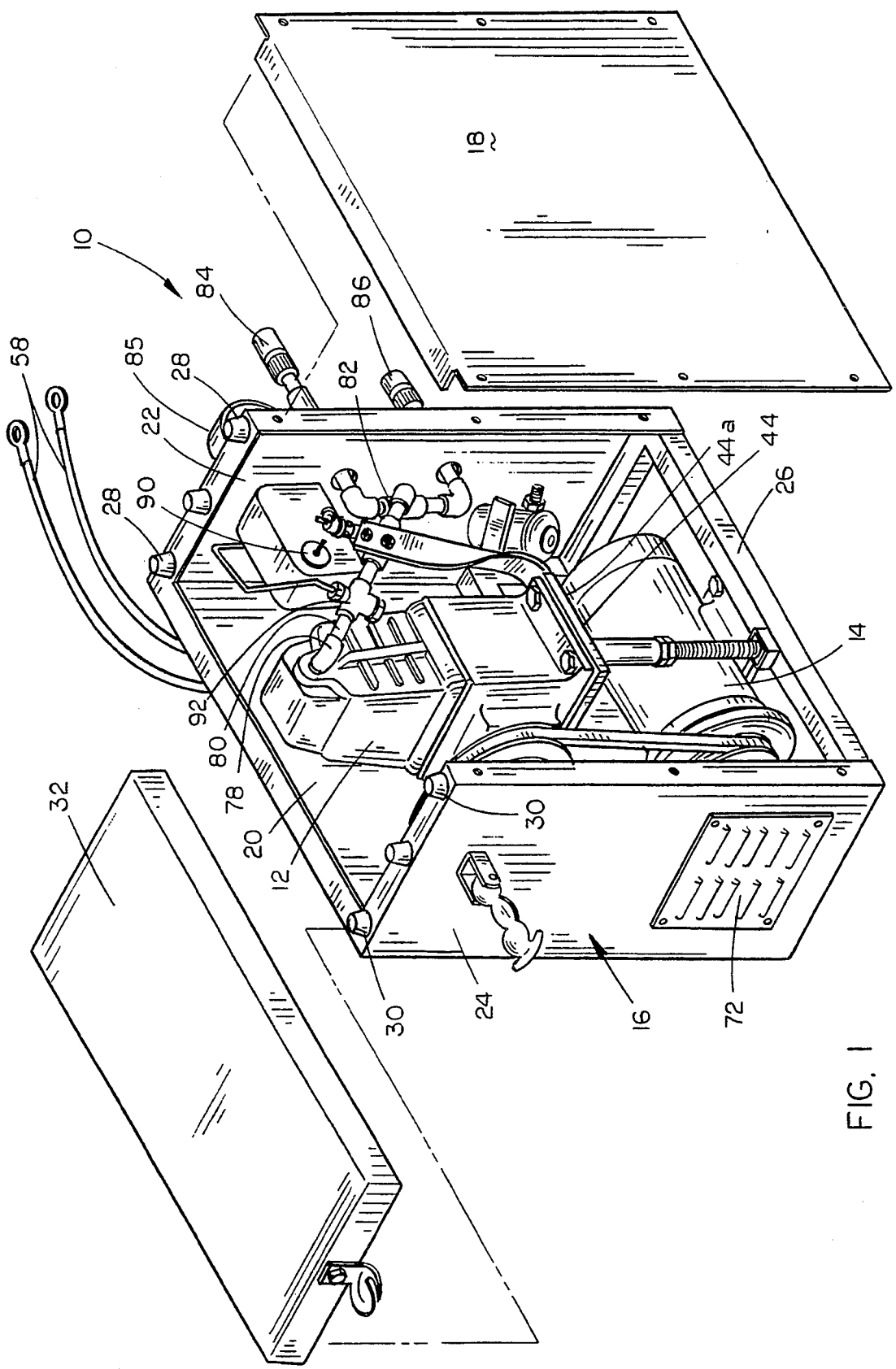
FIG. 1 is a perspective view of the air compressor of the present invention with the front cover and top cover removed for clarity.

Referring now to the drawings, in which similar or corresponding parts are identified with the same reference numeral, and more particularly to FIG. 1, the air compressor of the present invention is designated generally at 10 and includes a pump 12 and motor 14 mounted within an enclosed housing 16.

Figure 2:
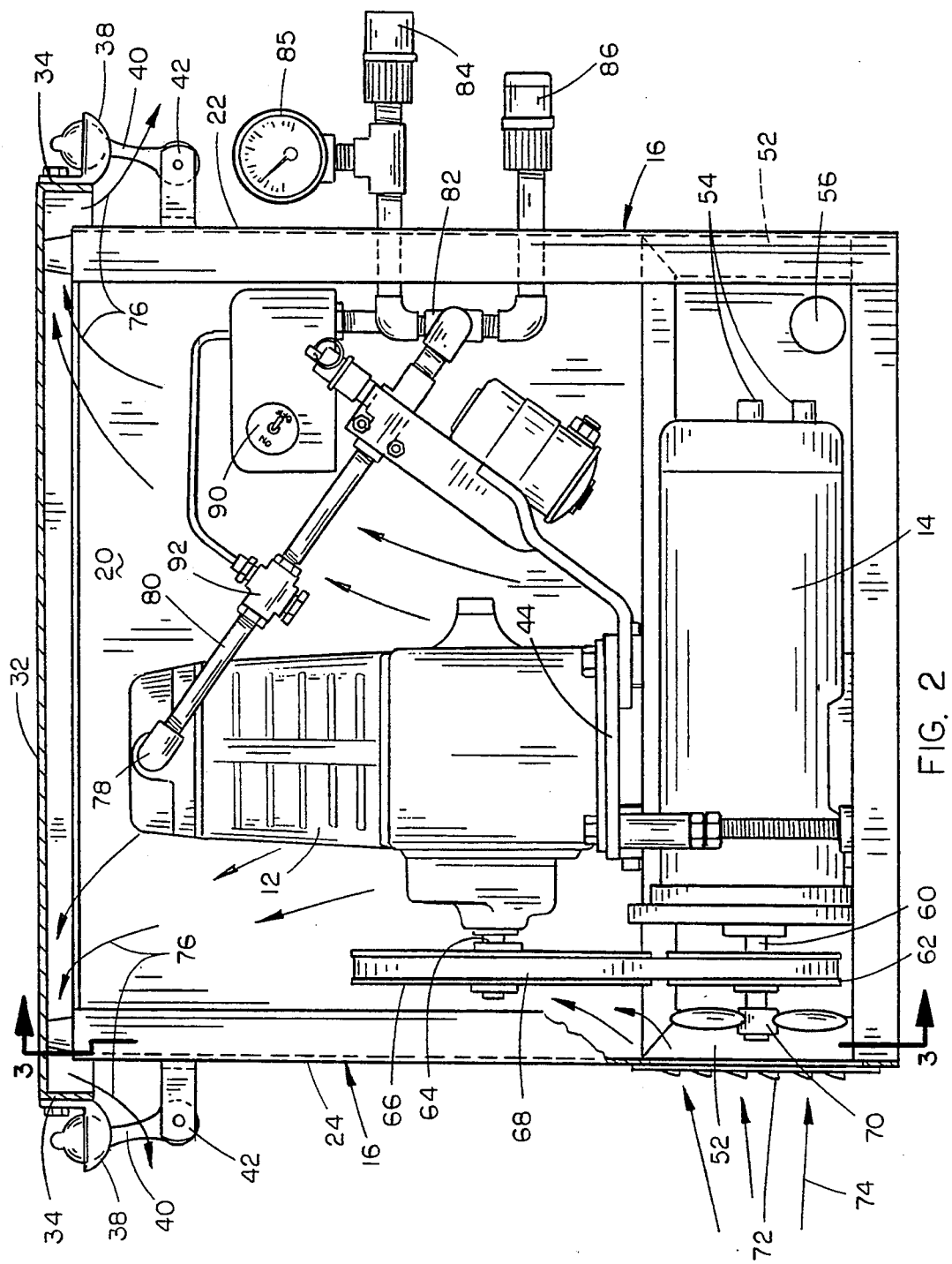
FIG. 2 is a front elevational view of the invention, with the front cover removed for clarity.
Figure 3:
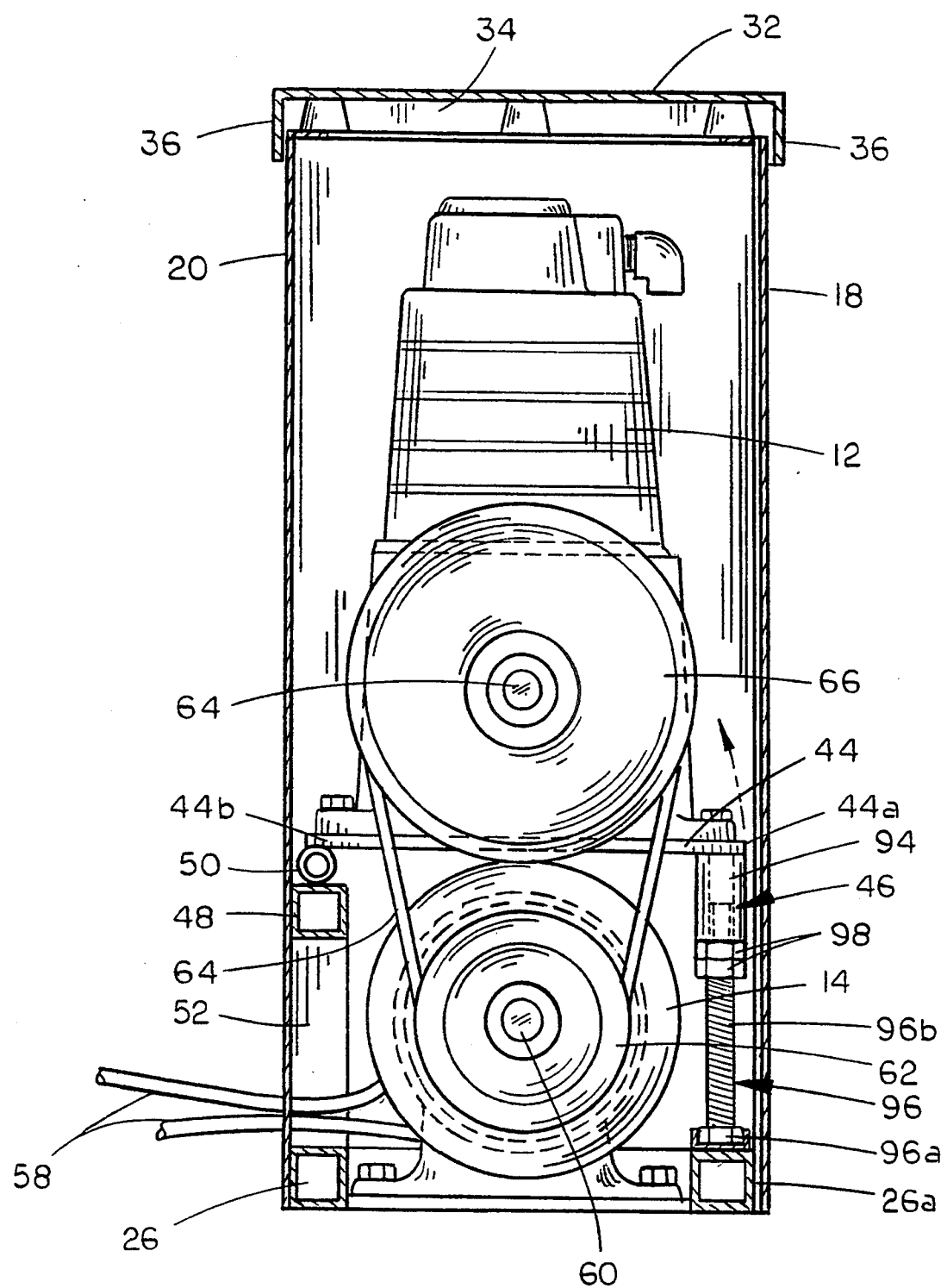
FIG. 3 is a sectional view taken at lines 3—3 in FIG. 2.

Housing 16 includes a front panel 18, rear panel 20, right side panel 22, and left side panel 24 all connected together and fastened to an open bottom frame 26. A pair of studs 28 project upwardly from the upper end of right side panel 22, and a second pair of studs 30 project upwardly from the upper end of left side panel 24. A top cover 32 is supported on stubs 28 and 30 and spaced above the upper ends of panels 18, 20, 22 and 24. As shown in FIG. 2, top panel 32 has a pair of depending end walls 34 which depend downwardly beyond the upper edge of side panels 22 and 24. Top cover 32 has a length longer than the length of housing 16 (as measured by the length of rear panel 20) so as to form an air passage between depending walls 34 and the upper ends of side panels 22 and 24. As shown in FIG. 3, top panel 32 includes depending longitudinal side walls 36 which depend downwardly a distance lower than the upper ends of front and rear panels 18 and 20.

A pair of receiver sockets 38 project outwardly from end walls 34 and are designed to removably receive one end of a connector link 40. Connector links 40 are pivotally connected at a lower end to brackets 42 projecting outwardly from end panels 22 and 24. Connector links 40 are preferably formed of a flexible resilient and elastic material which applies a downward biasing force on receiver sockets 38 when moved to the connected position shown in FIG. 2. The elasticity of links 40 permits the upper end to be stretched upwardly to disconnect links 40 from sockets 38, thereby permitting removal of top cover 32.

Referring now to FIGS. 1-3, pump 12 is mounted to the upper surface of a base plate 44 which is vertically adjustably supported along a forward edge 44a by adjustment leg 46. As shown in FIG. 3, the rearward edge 44b is pivotally supported on a frame member 48 by hinge 50. Support member 48 is mounted horizontally on a pair of vertical supports 52 (shown in FIG. 2) above bottom frame 26.

Motor 14 is mounted to bottom frame 26, and is preferably a one horse power heavy duty high torque 12-volt DC motor having a pair of electrical terminals 54 on the rearward end thereof (as shown in FIG. 2). As aperture 56 in rear panel 20 provides access to a pair of electrical cables 58 (shown in FIG. 1) which connect motor 14 to the battery of a vehicle or other power source.

Referring to FIG. 2, motor 14 includes a drive shaft 60 projecting from the forward end thereof and having a pulley 62 affixed thereto for rotation therewith. Pump 12 has a drive shaft 64 projecting from a forward end thereof with a pulley 66 mounted thereto for rotation therewith. A drive belt 68 extends between pulleys 62 and 66 to interconnect the power of motor 14 to drive pump 12.

A fan blade 70 is mounted on the projecting end of motor drive shaft 60 with the blades oriented so as to draw air through a vent panel 72 in left side panel 24 as shown by arrows 74 because top cover 32 is spaced above the upper ends of side panels 22 and 24, air flow through housing 16 enters through vent panel 72, moves over and around pump 12 and then exits from housing 16 through the space between top cover 32 and the upper ends of side panels 22 and 24, as shown by arrows 76. Thus, the location of pump 12 above motor 14 helps to prevent overheating of motor 14, since cool air is drawn in adjacent motor 14 and heated air flows away from motor 14 upwardly and out of housing 16 at cover 32.

Referring again to FIGS. 1 and 2, pump 12 includes an air outlet 78 having a conduit 80 extending therefrom to a "T" joint 82 adjacent side panel 22. Air flow is then divided to upper and lower ports 84 and 86 respectively. Preferably, upper port has a pressure gage 85 interposed thereon, and may be connected directly to air tools or the like. Lower port 86 is preferably connected to an air tank, or other apparatus.

A switch 90 is electrically connected to motor 14, to selectively operate the same, in a conventional fashion. Other features such as check valve 92 may be added as desired.

Referring once again to FIG. 3, adjustment leg 46 provides a simple apparatus for replacing drive belt 68, or adjusting the tension on drive belt 68. Adjustment leg 46 includes an upper tubular member 94 affixed to the bottom of the forward edge of base plate 44, and depending therefrom. A threaded bolt 96 has its head end 96a mounted on an upper surface of bottom frame forward member 28a with the threaded shaft 96b extending upwardly and slidably journaled within the lower end of tube 94. A pair of nuts 98 are threadably engaged on bolt shaft 96b, with tube 94 supported thereon. In this way, rotating nuts 98 in one direction will cause the nuts to move upwardly along shaft 96b, thereby pivoting base plate 44 about hinge 50 and raising pump 12 relative to motor 14, thereby increasing the tension on drive belt 68. Rotating nuts 98 in the opposite direction lowers pump 12, thereby loosening drive belt 68, permitting replacement thereof.

In operation, it can be seen that air compressor 10 of the present invention is retained within a compact housing, which prevents rain and other harsh weather conditions from reaching the pump 12, motor 14, or other components of the compressor 10. Although the compressor components are mounted within an enclosed housing, the location of pump 12 above motor 14, in combination with a ventilation system which draws air from the bottom of the housing and vents it out the top of the housing, ensures that motor 14 will remain cool even during continuous operation. Adjustment leg 46 permits simple and efficient replacement or adjustment of the tension on drive belt 68.

Whereas the invention has been shown and described in connection with the preferred embodiment thereof, it is understood that many modifications, substitutions and additions may be made which are within the intended broad scope of the appended claims.

I claim:

1. An air compressor, comprising:
   an enclosed housing, including opposing front and rear panels, opposing right and left side panels, a top cover and a bottom frame;
   drive means for driving a pump, mounted within said housing on the bottom frame;
   a pump mounted within said housing and located vertically above said drive means;
   said pump having an air outlet connected to a conduit and fluidly communicating therethrough, said conduit projecting outwardly through said housing;
   said drive means operably connected to said pump for operating the same to provide compressed air through said conduit; and
   ventilation means for circulating air into and out of said housing, including:
   a perforated ventilation panel located in a lower end of said housing to permit air flow therethrough;
   at least one ventilation opening in an upper end of said housing to permit air flow therethrough; and
   a plurality of studs projecting upwardly from an upper edge of said side panels, supporting said top cover spaced above the upper edge of said side panels to form said ventilation opening.

2. The air compressor of claim 1, wherein said top cover has a length greater than the length of said front and rear panels, so as to project outwardly beyond the side panels, and further comprising a pair of end walls depending from ends thereof, and a pair of side walls depending from longitudinal sides thereof, said end walls and side walls connected to form a continuous depending wall around the peripheral edge of said top cover.

3. The air compressor of claim 2, wherein said top cover depending walls extend downwardly a distance greater than the height of said studs.

4. The air compressor of claim 1, wherein said ventilation means further includes a fan positioned within said housing adjacent said ventilation panel, and operable to draw air into said housing through said ventilation panel.

5. The air compressor of claim 4, wherein said fan is operable connected to said drive means for operation therewith.

6. An air compressor, comprising:
   an enclosed housing, including opposing front and rear panels, opposing right and left side panels, a top cover and a bottom frame;
   drive means for driving a pump, mounted within said housing on the bottom frame;
   a pump mounted within said housing and located vertically above said drive means;
   said pump having an air outlet connected to a conduit and fluidly communicating therethrough, said conduit projecting outwardly through said housing;
   said drive means operably connected to said pump for operating the same to provide compressed air through said conduit;

said drive means including an operable drive shaft with a first pulley mounted thereon for rotation therewith;

said pump including an operable drive shaft with a second pulley mounted thereon for rotation therewith;

said drive means being operably connected to said pump by a continuous loop drive belt extending around first and second pulleys;

adjustable tensioning means for adjustably increasing and decreasing the tension on said drive belt;

said tensioning means including:

a base plate having forward and rearward edges and upper and lower surfaces, pivotally connected along its rearward edge to a rearward frame member supported above said bottom frame, for pivotal movement about a generally horizontal axis;

an adjustable length leg operably connected between the forward edge of said base plate and a forward frame member of said bottom frame, for selectively pivoting said base plate by increasing and decreasing the length of said leg;

said pump being mounted on the upper surface of said base plate for pivotal movement therewith; and said drive means mounted separately from said base plate, such that adjustment of the adjustment leg increases and decreases the distance between the first and second pulleys; and ventilation means for circulating air into and out of said housing.

* * * * *